Patented Aug. 22, 1933

1,923,880

UNITED STATES PATENT OFFICE 1,923,880

PRESSURE FERMENTATION OF DOUGH FOR BREAD AND SIMILAR BAKERY PRODUCTS

William F. Petersen, Chicago, Ill.

No Drawing. Application September 4, 1930
Serial No. 479,801

8 Claims. (Cl. 99—10)

My invention relates to the process of preparing the dough used in baking bread and similar food stuffs. It has more particular reference to the stage or step of the process during which fermentation of the ingredients takes place and as a result of which the "sponge" is secured.

It is one of the objects of my invention to secure a reduction in the time usually required for the fermentation stage, and I accomplish this in both a novel and simple manner. The steps of the process are dependable, and the food products resulting from the practice of my method are both palatable and nutritious.

In the process of preparing bake stuffs the fermentation of the dough by means of yeast is one of the essential procedures. The first stage or step in the ordinary bake shop technique involves the preparation and the securing of the so-called "sponge", which consists in the preliminary fermentation of approximately one-half of the total or final mass of material. In this first stage flour, water, salt, sugar, yeast and the other ingredients are mixed in the required proportions, after which the mixture is permitted to ferment or "raise" during a period of time lasting between four and five hours.

During the stage of preliminary fermentation the chemical reaction converts the starches into sugars, and the sugars of the original mass are converted into alcohols and carbon dioxide. The proteins "develop" during this fermentation stage, that is to say, the hydration of the gluten takes place with the formation of an elastic and rubbery or gummy colloidal mass, the coagulation of which during baking is essential for the structural frame-work of the bread stuff. Other enzymatic and chemical processes or reactions also occur during this preliminary fermentation stage. When the "sponge" has become sufficiently developed it is knocked down,—that is, the accumulated gases that sustain the "sponge" are beaten out by kneading or otherwise thus bringing fresh supplies of oxygen into contact with the mass of dough.

After the "sponge" has been knocked-down the remaining portion of the ingredients (flour, water, salt, etc.) are added and the whole mass is then worked into the final batch or mass of dough. A second or final stage of fermentation of short duration is now permitted, after which the dough is divided into the individual bread loaves or cake units.

Heretofore numerous attempts have been made to shorten or reduce the period of time required for fermentation, which, of course, is a considerable item of expense because of the fact that during the four or five hours of preliminary (first stage) fermentation the mass or batch is not disturbed and therefore the operators must remain idle unless provided with some other labor in the bakery.

Various "yeast foods", such as salts of the iodides, bromides, etc. have been suggested, and the quantity of the yeast itself has been increased, but all processes that have previously been suggested and of which I am aware, are relatively costly.

As far as I have been able to ascertain it has not been suggested nor have attempts been made by others to determine the effect of an increase in pressure (above atmospheric pressure) upon the fermenting dough in order to speed up the rate of ripening the "sponge". I have accordingly conducted experiments of this character using the simple method of permitting the "sponge" ripening or fermentation to take place within closed chambers wherein the pressure of the evolved gases becomes increasingly greater in proportion to the length of time of the fermentation stage. Pressures of a definitely determined degree may also be secured by simple mechanical means. In the course of my experiments I have ascertained that fermentation under pressure, created either mechanically or by increasing volume of the gases evolved by fermentation, materially reduces the length of time necessary for the production of a satisfactory "sponge". Inasmuch as the enzymatic process involved in alcoholic fermentation is an anaerobic one, the development of the "sponge" under the conditions herein outlined is logical from a chemical standpoint. Also there is no loss of water or moisture by evaporation. And it will also be apparent that all the properties of the ingredients are retained and are not dissipated in the atmosphere.

The simplest means for practising my process involves merely the placing of the dough in a proper receptacle which is preferably sealed air-tight in such manner as to resist substantial super-atmospheric pressure and to prevent the escape of the gases. The pressure developed by the gases evolved by the fermentation of the ingredients has been found by me to range between 30 and 40 pounds per square inch, the interior of the closed chamber being at a temperature of approximately 87° F., or slightly higher than room temperature.

In the foregoing I have described the application of my improvements to the "two stage" process of making dough for bread-stuffs, but it is obvious that my improvements are equally applicable to the "straight dough" process. The latter process contemplates the mixing of all the components of the batch in one entire mass and then setting the same aside to ferment for four or five hours. In other words the entire batch is mixed and fermented in a single stage instead of in two stages. In this "straight dough" method according to my invention the fermentation takes place in a closed and sealed vessel wherein the evolved gases and moisture are retained and pressure is created. This materially reduces the length of time usually required for the fermentation of the batch.

The pressure generated by the evolved gases is sufficient for the purpose which I have in view. However, as mechanically created pressure may be employed, I claim any and all methods of increasing the pressure during the fermentation stage as coming within the scope of my invention. I have discovered that the increase of pressure, above normal atmospheric pressure within the chamber containing the ingredients for conversion into dough hastens the chemical process involved, ripens the dough in a shorter time, and develops the gluten more rapidly. I have also found that this produces a palatable flavor in the finished bread.

What I claim is:—

1. A process for accelerating the fermentation of yeast dough for bread and similar bakery products through the influence of pressure, said process consisting of placing the dough batch, immediately after mixing the ingredients thereof, in an air-tight container, sealed in a manner to resist substantial pressures, and fermenting the batch in said container under super-atmospheric pressure.

2. A process for accelerating the fermentation of yeast dough for bread and similar bakery products through the influence of pressure, said process consisting of placing the dough batch, immediately after mixing the ingredients thereof, in an air-tight container, sealed in a manner to resist substantial pressures, and fermenting the batch in said container under super-atmospheric pressure, such pressure being developed by the fermentation of the dough itself.

3. A process for accelerating the fermentation of yeast dough for bread and similar bakery products through the influence of pressure, said process consisting of placing the dough batch, immediately after mixing the ingredients thereof, in an air-tight sealed container, fermenting the batch in said container under extraneous substantial super-atmospheric pressure.

4. A process for accelerating the fermentation of yeast dough for bread and similar bakery products through the influence of pressure, said process consisting of placing the dough batch, immediately after mixing the ingredients thereof, in an air-tight sealed container, fermenting the batch in said container under the pressure developed by the fermentation of the dough itself, and augmenting such pressure by the introduction of an extraneous substantial super-atmospheric pressure.

5. A process for accelerating the fermentation of yeast dough for bread and similar bakery products through the combined influence of temperature and pressure, said process consisting of placing the dough batch, immediately after mixing the ingredients thereof, in an air-tight container at a temperature above normal dough temperatures, sealed in a manner to resist substantial pressure, and fermenting the batch in said container under super-atmospheric pressure and at said increased temperature.

6. A process for accelerating the fermentation of yeast dough for bread and similar bakery products through the combined influence of temperature and pressure, said process consisting of placing the dough batch, immediately after mixing the ingredients thereof, in an air-tight container at a temperature above normal dough temperatures, sealed in a manner to resist substantial pressures, and fermenting the batch in said container under super-atmospheric pressure and at said increased temperature, such pressure being developed by the fermentation of the dough itself.

7. A process for accelerating the fermentation of yeast dough for bread and similar bakery products, through the combined influence of temperature and pressure, said process consisting of placing the dough batch, immediately after mixing the ingredients thereof, in an air-tight sealed container at a temperature above normal dough temperatures, fermenting the batch in said container at said increased temperature, and under extraneous substantial super-atmospheric pressure.

8. A process for accelerating the fermentation of yeast dough for bread and similar bakery products, through the combined influence of temperature and pressure, said process consisting of placing the dough batch, immediately after mixing the ingredients thereof, in an air-tight sealed container at a temperature above normal dough temperatures, fermenting the batch in said container under the pressure developed by the fermentation of the dough itself and at said increased temperature, and augmenting such pressure by the introduction of an extraneous substantial super-atmospheric pressure.

WILLIAM F. PETERSEN.